March 8, 1949.         A. E. KINSEY         2,463,883
TUBE COUPLING
Filed April 24, 1946
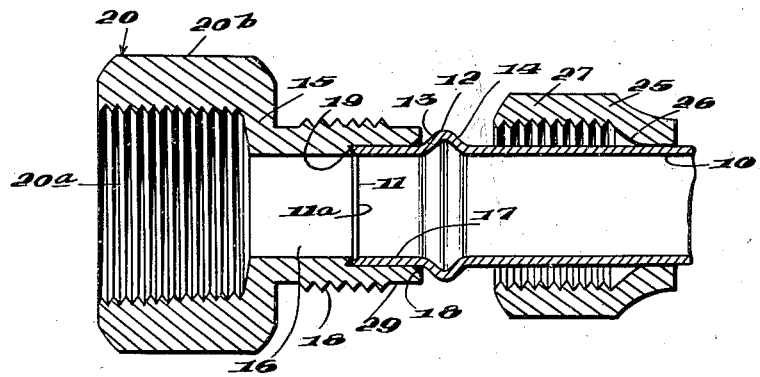
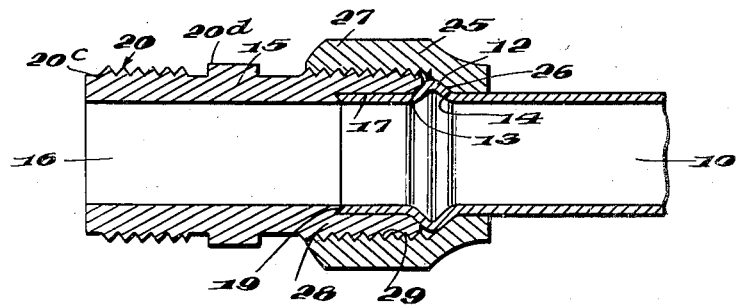
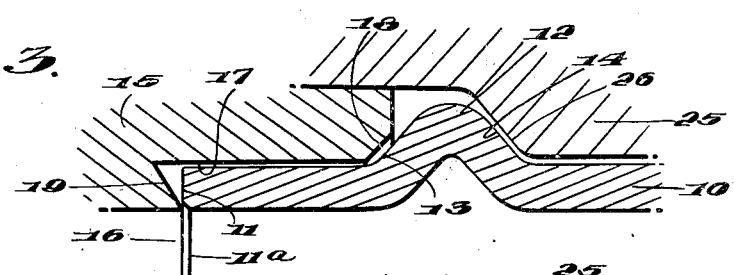
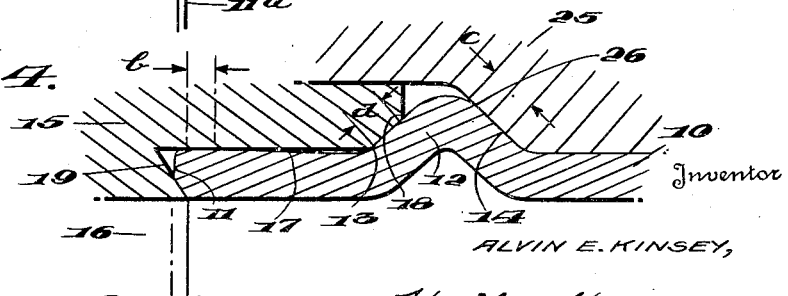
Inventor
ALVIN E. KINSEY,
By Hall & Houghton
Attorney Patented Mar. 8, 1949

2,463,883

UNITED STATES PATENT OFFICE 2,463,883

TUBE COUPLING

Alvin E. Kinsey, Chattanooga, Tenn., assignor to Furlow-Cate Manufacturing Company, Inc., Hapeville, Ga., a corporation of Tennessee Application April 24, 1946, Serial No. 664,590

2 Claims. (Cl. 285—86)

This invention relates to tube coupling and aims generally to improve the same. The invention is particularly adapted for forming a perfect fluidtight seal that may be broken and replaced at will for handling high or low pressure gas, air, or other fluid, and is especially applicable to forming such connections in lines of soft metal tubing such as copper, aluminum and the like.

A primary object of the invention resides in the provision of a coupling of the class described having a minimum number of parts and assuring a pressuretight seal.

A further object resides in the provision of a coupling in which all parts are self aligning insuring a true and accurate fit.

A further object resides in the provision of cooperating abutments adapted to afford a multiple seal of the coupling against leakage and to provide, by employing the ductility of the tubing itself, a pressure packed connection which may be broken and reassembled without excessive care, and yield again a fully pressuretight joint.

Further objects and advantages of the invention, as will appear from the following description of preferred embodiments thereof, reside in the provision of an improved method of coupling and improved features and combinations of parts contributing to the realization of the aforesaid objects.

In the accompanying drawings of preferred embodiments illustrative of the invention Fig. 1 is a longitudinal sectional view of one form of coupling prior to tightening of the same.

Fig. 2 is a similar view of a second form showing the parts in tightened relation.

Figs. 3 and 4 are enlarged fragmentary sections showing the relation of the parts prior to and following effecting of the seal, being made somewhat diagrammatic and exaggerated in the interest of clarity.

Referring to the drawings of the illustrative embodiments in which like reference numerals indicate like parts, the tube 10 to be connected is preferably a soft metal tube of aluminum or copper, for example, and is provided with a squared end 11 at its extremity which in the form shown is slightly internally beveled, as at 11a (see Figs. 1 and 3). At a predetermined distance from the tube end 11, preferably a distance greater than the radius but less than the diameter of the tube, the tube 10 is provided with an integral outwardly struck annular boss or bead 12 preferably hollow and of the rounded V-shape shown, and preferably having its side walls 13 and 14 (Figs. 1 and 3) inclined at substantially 45° relative to the axis of the tube for the purpose hereinafter described.

The coupling further comprises the body member 15 having a cylindrical bore 16 of a substantially smaller diameter than the external diameter of tube 10 and preferably corresponding in diameter to the internal diameter of the tube as shown. The body member 15 is further provided with a cylindrical counterbore 17 concentric with the bore 16 and of a diameter to closely but freely receive the end of the tube 10 (see Fig. 3) and with an outwardly flared shoulder 18 at the outer end of the counterbore 17 to be engaged by the adjacent wall 13 of the V-shaped hollow boss 12 when the coupling is assembled. At the junction between the bore 16 and counterbore 17 the body member is provided with an annular seat, preferably undercut on a reverse bevel as shown, which desirably has an angle of about 30° providing a 60° pocket between the seat 19 and the adjacent wall of counterbore 17. As best shown in Figs. 3 and 4 counterbore 17 has a depth slightly less than the predetermined length of the portion of the tube 10 between the tube end 11 and boss 12 so that on assembly of the fitting the tube end 11' engages with the annular seat 19 prior to the engagement of wall 13 with shoulder 18. In other words, the spacing of the outer and inner abutments 18 and 19 of the counterbore must be so related to the spacing of the beveled abutting faces 11a and 13 of the tube, that when the coupling is tightened, the face 11a will be forced into pressure-tight engagement with the face 19 before the engagement between faces 13 and 18 arrests such forcing movement. In the ideal case, with face 19 undercut at the same angle as countersunk-face 11a, the spacing between faces 11 and 13 might be just enough greater than that between faces 18 and 19 to correspond to the depth of the bevel 11a so that the bevel 11a would engage substantially simultaneously with the first contact at 18 and be forced into sealing relation during the slight movement of the tube relative to face 18 that accompanies tightening of the coupling. However, as the depth and angularity of the bevel 11a and the face 19 may vary, and as the angle of the bevel 11a, being made with a different tool, may differ slightly from that of 19 (as illustrated to an exaggerated scale in Fig. 3), it is preferred to have the excess, of the spacing of faces 11 and 13 over that of faces 18 and 19, slightly greater than that which would be required in the ideal case. The departure from the ideal in this connection in the case of a hard drawn or heavy tube would, of course, be less than in the case of a very soft one.

The body member 15 further comprises a suitable connecting element 20 of any desired form. In the form shown in Fig. 1, this element comprises an internally pipe threaded head 20a externally formed at 20b of hexagonal or other shape or otherwise arranged to enable the body member 15 to be engaged with a pipe member or be securely held during assambly of the coupling. In the form shown in Fig. 2 the element 20 comprises an externally machine screw threaded nipple 20c and a hexagonal or other holding or turning element 20d, exemplifying other arrangements which may be adapted for associating the coupling of this invention with other structure.

The third member of the tube connector, as is best shown in Figs. 1 and 2, comprises a coupling element 25 which is slipped over the tube 10 before formation of the boss 12 therein, but which may be assembled on the tube from its other end before distortion thereof. This coupling 25, which is further detailed in Figs. 3 and 4, is annular in form and is provided with an annular shoulder 26 formed to engage against wall 14 of boss 12 in the assembly of the tube connection. Shoulders 18 and 26 of the body and coupling elements 15 and 25 are preferably formed at an angle of approximately 45° as hereinafter described, and side walls 13 and 14 of boss 12 are desirably given a corresponding inclination.

Suitable means is provided for associating the coupling element 25 with the body element 15, in the forms shown by the provision of a threaded engagement between these members. In the illustrative embodiment the coupling element 25 which is slipped over the tube 10 embraces the tube loosely at is shouldered end 26 remote from the body member 15 and has a female threaded portion 27 which lies in spaced relation to the tube at a distance sufficient to accommodate boss 12, and which engages with a male threaded connection 28 formed externally of body member 15, beyond the smooth lead-in or guide portion 29.

With the construction described, the coupling element 25 having first been slipped over the end of tube 10, the tube, provided with the squared end 11, is upset to form boss 12, preferably by at least externally supporting the tube wall at each side of the area to be upset and applying longitudinal pressure to the squared end 11. This operation results in slightly thickening the metal of the tube wall throughout at least the area distorted to form boss 12, and this operation is preferably performed with external support of the tube only so as to thicken the metal wall slightly in the portions of tube 10 adjacent to the boss without enlargement of their external diameter, thus increasing the strength of the tube at these areas for the purpose hereinafter described. The boss 12 having been upset the tube end 11 is slipped into the counterbore 17 of body member 15, in which it has an easy sliding fit, and its end 11 comes to rest against the seat 19, with boss wall 13 still in slightly spaced relation to shoulder 18 as shown to an exaggerated scale in Figs. 1 and 3. The coupling element 25, guided and aligned by tube 10 is slipped over the unthreaded end 29 of the body member 15 which serves as a further guide to align the threaded section 27 of the coupling member 25 with the threaded section 28 of body 15. The threaded sections 27 and 28 engage with one another and preferably are screwed together throughout all but a few turns of their interlocking engagement before the shoulder 26 abuts wall 14 of boss 12. Further tightening of the coupling element thereafter forces the tube end 11 into tight engagement with seat 19 and compresses the tube end against the seat to such extent that the relatively soft metal of the tube is caused to flow and come to a pressure tight engagement with the annular seat 19 as exemplified by area a, Fig. 4.

In the preferred embodiment in which the annular seat is reversely undercut on an angle of about 30° as shown, the compression of the tube end face 11—11a on the inclined surface 19 causes a further flow of metal forcing an annular section of the tube closely adjacent to the tube end 11 to expand into pressure tight engagement with the wall of counterbore 17, adjacent the annular seat 19, as exemplified by area b, Fig. 4. This same tightening operation of the coupling element 25 causes the coupling shoulder 26 to press against wall 14 of boss 12 and moves the tube until wall 13 of the boss engages shoulder 18, thereafter compressing boss 12 between the shoulders 18 and 26 as shown in Fig. 4. By this means a multiple fluidtight seal is effected, the first seal lying in the area exemplified at a, Fig. 4 constituting the primary seal, the further seal lying in the area exemplified at b, in the preferred embodiment constituting an added primary seal, the additional seal effected in the area of engagement between shoulder 18 and boss wall 13 constituting a secondary seal, and some additional seal also being effected by the engagement of walls 14 and 26 and the threaded engagement between parts 27 and 28, Figs. 1 and 2. As the primary seal or seals are made at protected regions, any denting or other minor damage of the end 18 of body 15, even if it extends into the flared shoulder 18 itself, is rendered inconsequential so far as the primary seal is concerned.

As is further apparent from Fig. 4, the particular manner of coupling by means of seat 19 engaging tube end 11 and the gripping of tapered boss 12 between shoulders 18 and 26 itself may effect a slight thickening of the tube 10 adjacent the end 11, thus further insuring against thinning of the tube, throughout the extent of the coupling. As before mentioned, the mode of upsetting the boss 12 as shown in Figs. 3 and 4 has itself preferably produced a slight thickening of the tube wall in the area including the boss and this construction thus increases the strength of the tube at the coupling compared with its strength throughout the balance of the line. By virtue of this improvement, fracture of the tube within the coupling is obviated and no thinning or weakening of the tube occurs as is experienced in the flanged-end type of coupling, nor does any thinning of the tube wall accompany tightening of the coupling, as occurs when separate ferrules are employed designed to compress into, bite into, the metal of an initially straight tube wall. Further by limiting the depth of the counterbore 17, as described, provision is made for radial support of the tube end 11 against inward bending by its engagement with the seat 19, and as this support is afforded in relatively close relation to the boss 12 no material inward jamming of the tube wall occurs which would restrict the passage of the coupling nor is there any tendency towards tearing of the tube wall. In addition by the rounded V-shaped construction of boss 12 filleted corners are provided avoiding presence of any sharp angles at which stresses could concentrate and lead to metal fatigue in the event of long continued vibration in the line. Most importantly, by this construction the tube is gripped and supported at the boss area 14 which is separate and spaced from the primary sealing surfaces *a* and *b* Fig. 4 so that stresses applied to the tube are in no instance transferred to the primary sealing surface to cause loosening thereof.

As above mentioned, a particularly advantageous embodiment of this invention contemplates a 30° reverse bevel of the seat 19 and about 45° bevels of the surfaces 18 and 26 with substantially similar inclinations of walls 13 and 14 of boss 12. Further, the preferred embodiment of the invention employs a boss struck out of the metal of the tube by an amount approximately equal to or somewhat greater than the thickness of the tube wall, thus providing a somewhat flexible but substantially continuous metal area in most of that portion of boss 12 lying between the clamping shoulders 18 and 26. Due to the difference in taper between the shoulder 26 and the seat 19, the frictional contact of shoulder 26 against wall 14 is relatively great and tends to sweat the tube end 11 into firm engagement at the areas *a* and *b* in the preferred embodiment, while the near continuity of metal in the boss tends to avoid undue flattening of the boss and to cause instead a slight camming action of shoulders 18 and 26 against the boss forcing it into a condition of radial as well as longitudinal compression. As will be apparent, the creation of radial compression in the areas of the tube comprising and adjacent to boss 12 affords further strength and offsets any tension stresses transferred from the tube line.

Further, since as shown in Fig. 4, the entire end of tube 10, between the tube-end 11 and the boss 12, bridges between the primary sealing areas *a* and *b* and the integral boss 12, access of pressure from the line to the space between this bridging portion and the counterbore wall 17 is prevented. Thus in very high pressure lines, the pressure tends solely to straighten the bridging portion outwardly against the bore wall 17, and by this straightening tendency tends to force the tube end 11 still more firmly into pressure sealing relation to the primary sealing areas *a* and *b*.

On unscrewing of the coupling element 25 to effect release of the connection the frictional contact between more steeply inclined surfaces 14 and 26 is sufficient so that, in conjunction with the slight resiliency of the metal of the tube end 11, it effects a loosening of the tube from seat 19, obviating any necessity for gripping and distorting the tube 10 in effecting its withdrawal from the body member.

After the coupling has once been drawn to a pressure tight joint and thereafter released it is found that the metal adjacent to the tube end in the area exemplified at *b* (Fig. 4) has been expanded into snug sliding fit with the counterbore 17, and that the annular area of contact exemplified at *c*, Fig. 4, is of considerable extent, and not as concentrated as that at *d*, Fig. 4. Since the counterbore 17 is preferably machined to a smooth cylindrical surface the expanded tube end 11 may nevertheless be readily pulled out of the counterbore and can be readily reinserted, the beveled shoulder 18 acting as an entrance guide for this purpose. On re-insertion it is not necessary to make certain that the tube 10 takes the same rotative position relative to seat 19 that it had on first assembly, since by re-tightening the coupling member 25 to an extent somewhat greater than that effecting the original seal, a further compression is applied to the boss producing a further flow of metal at the tube end and again affording a pressure tight primary seal.

By the construction of the boss and the initial relatively free fit of the parts, provision is made for a camming inwardly of boss 12 by shoulder 18 on tightening of the connection, thus producing a slight arching and longitudinal movement of tube 10 relative to body member 15, and introducing slight additional tube length inside the counterbore 17 to insure full compression against the annular seat even after numerous re-sealings of the joint. The modes of contact achieved at the area exemplified by *c* and *d* in Fig. 4 also tend to insure longitudinal camming of the tube end, if necessary, to obtain a tight seal. It will further be apparent that the present construction is of great simplicity employing only two members in addition to the tube itself, that the sliding engagement of the parts provided is of a nature to make all members self-aligning and self-centering, and that accordingly no difficulty with crossed threads is encountered, nor is any jamming of the tube ends experienced.

As used herein the term "squared end," or "squared end face," has reference to the fact that the end 11 of tube 10 is cut on a plane normal to the axis of the tube, regardless of whether the tube end is planar before the coupling is tightened, or whether it is somewhat pre-beveled or countersunk as at 11a, toward the shape assumed by it in Fig. 4, as is usually desirable in the practice of this invention.

From the foregoing description it will be apparent that the embodiments shown and described are but illustrative and not restrictive of the invention herein described and claimed and that inventive features and combinations of this disclosure may be embodied in other specific forms.

What is claimed is:

1. A tube coupling comprising a cylindrical tube, said tube having a squared end face and an integral outwardly struck rounded V-shaped boss spaced a predetermined distance from said end face, a body member having a cylindrical bore of a substantially less diameter than the external diameter of the tube and having a cylindrical counterbore concentric therewith of a diameter to closely but freely receive the tube end, said body having an outwardly flared shoulder at the outer end of the counterbore to be engaged by the adjacent wall of said V-shaped hollow boss and said body having an annular seat at the juncture of said bore and counterbore to be engaged by the squared end face of said tube, said shoulder and seat being spaced from one another by a distance slightly less than the predetermined spacing of said boss and tube end face so that said tube end face engages with said annular seat prior to the engagement of said boss with said shoulder, and a coupling element embracing said tube and threadedly engaging with said body member, said coupling element having a flared shoulder for engaging the other wall of said boss, whereby on insertion of said tube into said counterbore and tightening of the threadedly engaged body and coupling members said tube is anchored and supported by compression of said integral boss between said shoulders, and a primary seal is effected by compressing the tip of said tube adjacent its end face and causing it to flow into pressure tight engagement with said annular seat.

2. A tube coupling comprising a cylindrical tube, said tube having a squared end face and an integral outwardly struck rounded V-shaped boss spaced a predetermined distance from said end face, a body member having a cylindrical bore corresponding to the internal diameter of the tube and having a cylindrical counterbore concentric therewith of a diameter to closely but freely receive the tube end, said body having an outwardly flared shoulder at the outer end of the counterbore to be engaged by the adjacent wall of said V-shaped boss and said body having an annular seat at the juncture of said bore and counterbore to be engaged by the squared end face of said tube, said seat being undercut on a reverse bevel and said shoulder and seat being spaced from one another by a distance slightly less than the predetermined spacing of said boss and tube end face so that said tube end face engages with said annular seat prior to the engagement of said boss with said shoulder, and a coupling element embracing said tube and threadedly engaging with said body member, said coupling element having a flared shoulder for engaging the other wall of said boss, whereby, on insertion of said tube into said counterbore and tightening of the threadedly engaged body and coupling members, said tube is anchored and supported by compression of said integral boss between said shoulders, and a primary seal is effected by compressing the tip of said tube adjacent its end face and causing it to flow into pressure tight engagement with said reversely beveled annular seat and the wall of said counterbore adjacent thereto.

A. E. KINSEY.

REFERENCES CITED

The following references are of record in the file of this patent:

UNITED STATES PATENTS

| Number | Name | Date |
|---|---|---|
| 1,804,814 | Schultis | May 12, 1931 |
| 1,817,854 | Sorenson | Aug. 4, 1931 |
| 1,872,863 | Wood | Aug. 23, 1932 |
| 2,087,185 | Dillon | July 13, 1937 |
| 2,089,790 | Halpern | Aug. 10, 1937 |
| 2,131,509 | Goepel et al. | Sept. 27, 1938 |
| 2,251,717 | Parker | Aug. 5, 1941 |
| 2,414,184 | Wurzburger | Jan. 14, 1947 |

FOREIGN PATENTS

| Number | Country | Date |
|---|---|---|
| 393,419 | Great Britain | June 8, 1933 |